May 2, 1967  J. S. JOHNSTON  3,316,958
FILM MOLECULAR STILLS AND EVAPORATORS
Filed April 12, 1965  3 Sheets-Sheet 1

INVENTOR
JAMES SLEATOR JOHNSTON
BY
Shoemaker and Mattare
ATTORNEYS

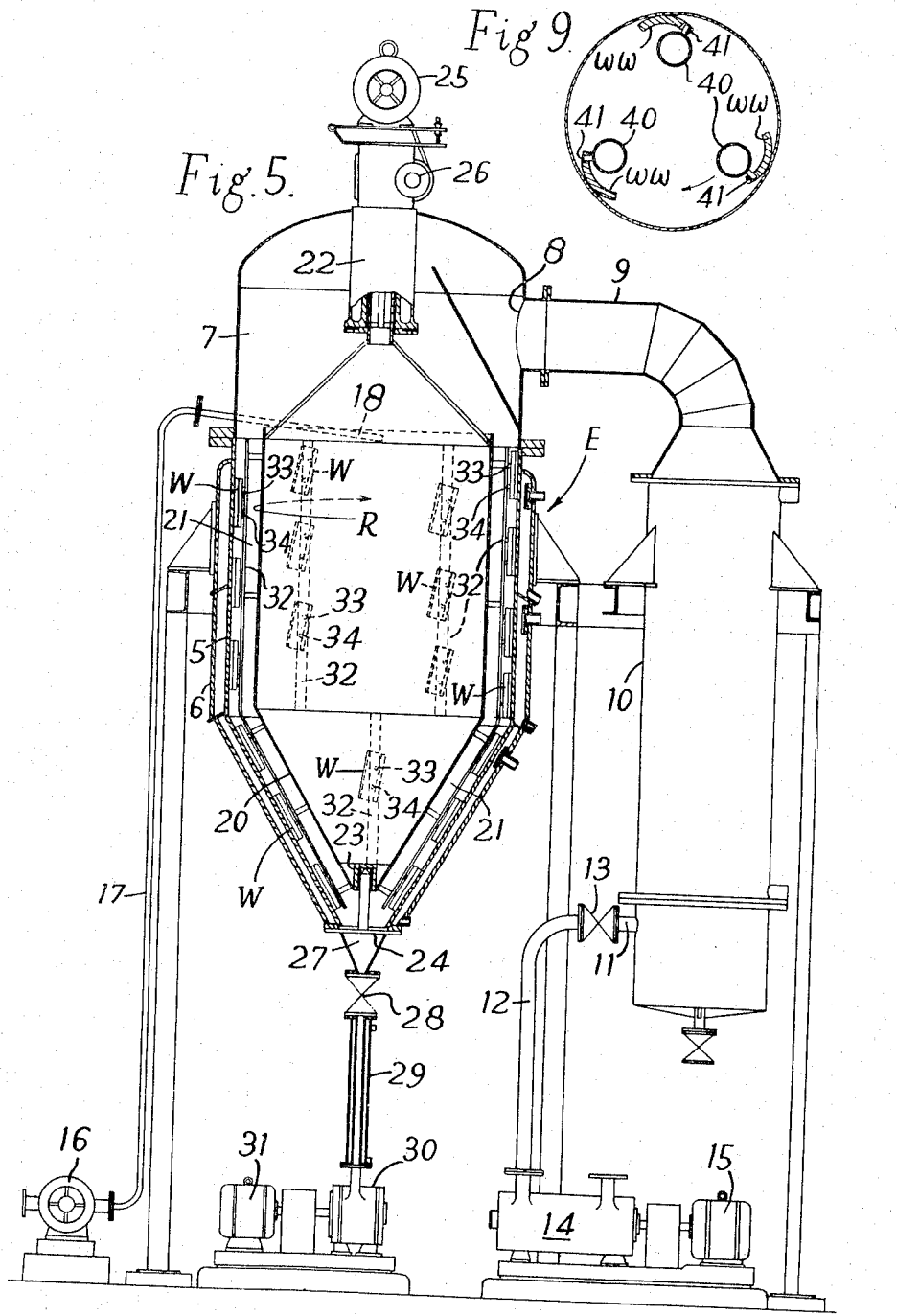

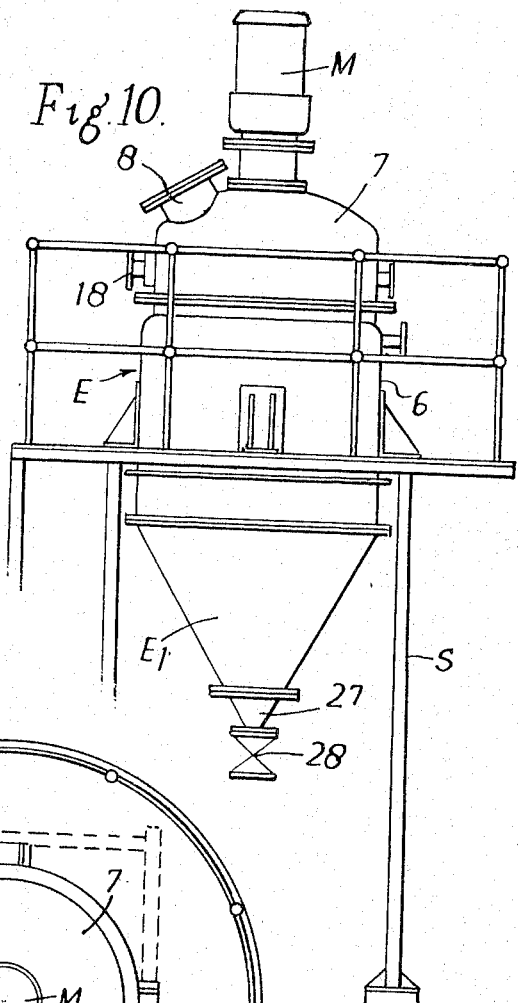
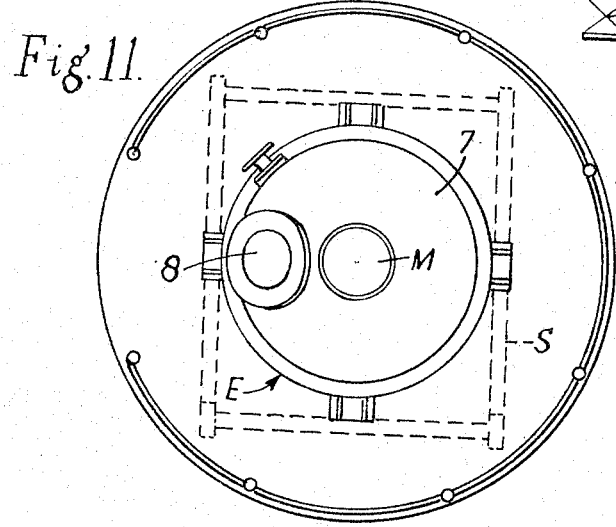

United States Patent Office 3,316,958
Patented May 2, 1967

3,316,958
FILM MOLECULAR STILLS AND
EVAPORATORS
James S. Johnston, Kirkcaldy, Fife, Scotland, assignor to Henry Balfour and Company Limited, Leven Fife, Scotland, a British company
Filed Apr. 12, 1965, Ser. No. 447,254
Claims priority, application Great Britain, Apr. 22, 1964, 16,685/64
12 Claims. (Cl. 159—6)

This invention relates to so-called film molecular stills and evaporators of the type comprising a heated internal surface of revolution forming the still or evaporator wall and hereinafter referred to as such; means to feed the product to be distilled or evaporated onto said wall; a rotor coaxial with said wall; and a spreader device or two or more spreader devices arranged at angularly spaced positions around the axis of said wall, said spreader device or devices being carried by the rotor so as to be rotatable therewith relative to said wall, said spreader device or devices being adapted as the rotor revolves to spread out the product fed onto the wall into the form of a thin film thereon, and said spreader device, or each of said spreader devices, including a wiper element extending lengthwise of said wall, or a series of such wiper elements operating on respectively different sections of the wall longitudinally thereof, which wiper element, or each of which wiper elements, is so mounted on the rotor as to possess freedom for movement relative thereto into and out of wiping contact with said wall, said movements into said contact being produced by centrifugal force operating in the element and arising from the rotational movement thereof around the rotor axis as the rotor revolves therearound and the form of the wiper element or elements, coupled with the disposition thereof, lengthwise of the element, relative to the rotor axis, being such that the element or elements operate as they wipe said wall to propel the product therealong toward a product outlet in the still or evaporator located at a position therein remote from the position at which the product is fed onto the wall.

According to the invention there is provided a film molecular still or evaporator of the type described, wherein (a) the or each wiper element has a form such that the operative (wiping) face of the element is of curvilinear profile in a plane perpendicular to the rotor axis, the curvature being outward with respect to said axis, (b) the or each wiper element is so mounted on the rotor as to possess freedom for limited floating movement relative thereto in a plane perpendicular to the rotor axis and (c) said form of the or each wiper element is further such, having regard to the scope of freedom for said floating movement possessed by the element, that when the element is in wiping contact with the still or evaporator wall its operative face contacts said wall along a line which is disposed between the leading and trailing edges of the face and at an inclination to the rotor axis.

With a wiper element of this description, as defined under a, b and c, the inclined disposition of the wiping line of the element relative to the rotor axis gives the effect of progressively moving the product film along the still or evaporator wall towards the product outlet of the apparatus. At the same time the wiper element has a true wiping action as it skids along the still or evaporator wall and the curl of product formed in the "nip" between the portion of the curved operative face of the element located forwardly of the wiping line and the still or evaporator wall ensures the formation of a positive film on the wall with no splash, or if there should be a little splashing the splashes will be immediately caught by said portion of the operative face of the element and returned thereby to the wall. Similarly, the gradual disengagement of the product film from the trailing "nip" behind the wiping line will prevent spitting, or if a little spitting should take place the droplets of product will be immediately trapped by the portion of the curved operative face of the element located rearwardly of the wiping line and thus returned to the wall.

According to a generally preferred form of the invention the or each wiper element simulates a segment of a cylinder, for example of substantially 90° angular extent.

Further according to said generally preferred form the or each wiper element has a plurality of holes extending through it which accommodate carrier pegs for the element incorporated in the rotor of the still or evaporator; said holes are circular; and said holes are spaced apart along a straight line which (1) is inset slightly from one of the two edges of the wiper element which are respectively the leading edge and the trailing edge thereof, according to whether the element is being trailed by the pegs or pushed thereby, (2) is disposed parallel to said one edge and (3) is at an angle to the rotor axis, in the elevational view of the rotor, so as to set the element at a corresponding angle thereto in said elevational view.

The construction may then be one in which the diameter of the holes is greater than the diameter of the pegs and the difference between the two diameters is such, having regard to the length of the holes, the radius of the operative face of the element, the length of the pegs, the orientation of the pegs relative to the rotor axis in a plane perpendicular thereto and the radius of curvature of the still or evaporator wall, that the element has complete freedom for floating movement on the pegs substantially in a plane perpendicular to the rotor axis between a non-wiping position in which its operative face is spaced from the still or evaporator wall and a wiping position in which its operative face is contacting said wall along a line which is located approximately midway between the leading and trailing edges of the element and which on account of the inclination of the line of contact of the element to the rotor axis extends obliquely to the rotor axis, the direction of said inclination being such that the component of thrust of the element upon the product film on the still or evaporator wall due to said inclination is in the direction of the product outlet of the still or evaporator.

The wiper element or elements, in the event of the still or evaporator being of the above described general form, may have either of two typical shapes, hereinafter referred to as shape A and shape B.

According to shape A the thickness of the element is uniform from end to end (i.e. substantially axially of the rotor of the still or evaporator) and from leading edge to trailing edge of the element—the element then simulating a segment of a cylinder whose inner and outer peripheries are plain cylindrical surfaces devoid of projections.

According to shape B the thickness of the element is substantially less than the length of the carrier peg holes in the element, the said holes extending through bosses projecting from the inner periphery of the element and affording the requisite length to the holes.

The wiper elements of the still or evaporator of this invention may be composed of any suitable material. In the case of shape A elements the material may conveniently be a wear-resistant composition, e.g. the material commonly known as Ferrobestos. In the case of shape B elements the component material of the element may be a metal or metal alloy, e.g. stainless steel, a plastics material or a ceramic material.

With the use of wiper elements of either of the aforesaid shapes A and B, and in a case wherein (as will be the case usually) there are a plurality of spreader devices in the still or evaporator arranged at intervals around he rotor axis, the construction may be one wherein each spreader device comprises a plurality of wiper elements arranged in line with one another longitudinally of the still or evaporator wall and at mutually spaced positions from one another axially of the rotor, the elements being in mutually staggered relation to one another in the respective spreader devices, longitudinally of the rotor, so as to be capable collectively of wiping the entire surface of the still or evaporator wall at least once in each complete revolution of the rotor.

The rotor of the still or evaporator of this invention, in the case where the wiper elements are mounted on carrier pegs as above set forth, may consist of a single tube of a diameter less than that of the still or evaporator wall, said tube being disposed coaxially with said wall and the carrier pegs for the wiper elements projecting from the outer surface of the tube.

Alternatively, in a case where further there are a plurality of spreader devices in the still or evaporator arranged at intervals around the rotor axis, the rotor may consist of a plurality of separate supporting members for the wiper element or elements of the respective spreader devices, said supporting members being disposed at angularly spaced positions around the rotor axis corresponding to said intervals.

Alternatively again in this last-mentioned case, the construction may be one wherein the carrier pegs are carried on the outer extremities of radial spokes extending outwardly from a central supporting member therefor forming part of the rotor. This construction is particularly advantageous when the product is of a viscous variety.

As in the particular embodiment of the invention hereinafter described, the construction may be one wherein the axis of the still or evaporator is vertical, or at a substantial angle less than a right angle to the horizontal, and the still or evaporator incorporates a product collection and discharge cone at the lower end thereof and the rotor incorporates at the lower end thereof a downwardly directed conical extension spaced at its outer periphery a short distance from the inner surface of the product collection and discharge cone and mounting at least one wiper for said surface. The or each wiper may then be carried on carrier pegs therefor projecting from the conical extension and along which the wiper is centrifugally urged into wiping contact with the discharge cone surface.

Alternatively to the use of wipers for the inner surface of the discharge cone scrapers may be employed, for example scrapers which are maintained in active contact with the discharge cone surface by centrifugal force.

The still or evaporator may be designed to operate at any desired processing temperature and pressure, e.g. with 200 p.s.i. saturated steam or 450° C. diphenyl oxide in the jacket of the wall and from say 1 (one) micron absolute to say 115 p.s.i. absolute in the shell, or with any other temperature/pressure (subatmospheric or superatmospheric) combination to suit the product being handled.

Dimensions may vary widely. In one typical case of a still whose length as regards the still wall was in the neighbourhood of 3 feet and whose internal (wall) diameter was 12 inches and in which there were three spreader devices arranged at 120° angular interval apart around the axis of the rotor, each spreader device comprising three wiper elements in mutually staggered relation in the respective spreader devices in the manner visualised above, the wiper elements were 6 inches long, of 2 inch outside radius and of ½ inch thickness, there being two peg holes in the element spaced 3 inches at centres apart to thread over pegs of ⅜ inch diameter and 1½ inch length, the pegs projecting radially from tubular supporting members of 2 inch diameter forming part of the rotor.

Various modifications are possible. For instance, the peg holes in the wiper elements may be elongated in the plane of floating movement of the element, instead of being circular. Generally, however, circular holes are preferable, as they leave more space between the hole and the peg for product to get away that might otherwise tend to deposit in and clog the hole. Also, in place of cylinder-segment section wiper elements, elements of full-cylindrical section may if desired be employed, the elements, in this case of tubular form, being mounted on suitably inclined (with respect to the rotor axis) pins extending lengthwise of the rotor. Here again, however, cylinder-segment section elements are generally preferable.

The invention is illustrated by way of example in the accompanying drawings, which as will be appreciated are largely schematic.

In these drawings:

FIGURE 5 is a general arrangement view of a film evaporation plant constructed in accordance with the invention;

Figure 6:
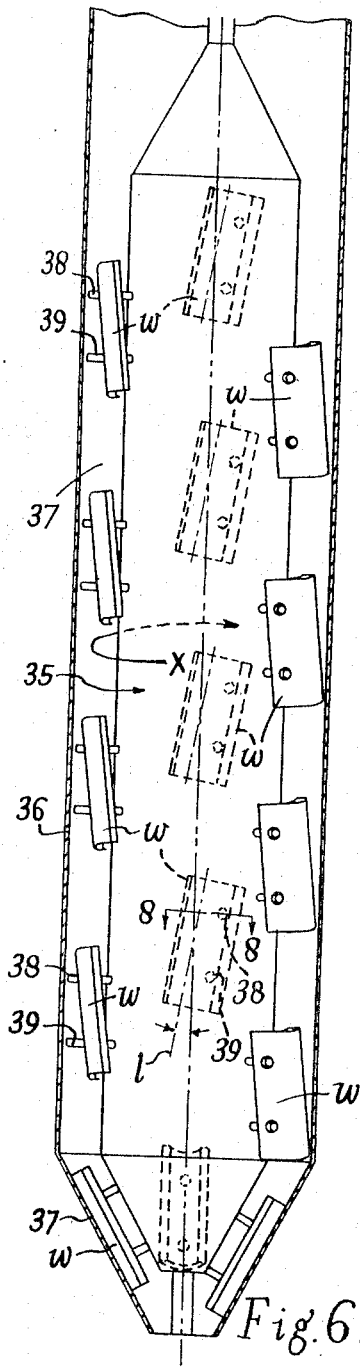
FIGURE 6 is a fragmentary axial section through a film evaporator in accordance with the invention, the rotor of the evaporator, carrying the wiper elements, being in this case torpedo-shaped, whereas, as will be seen, the rotor of the evaporator illustrated in FIGURE 5 has a form simulating a relatively large diameter (compared with its length) cylinder surmounting a cone frustum.
Figure 8:
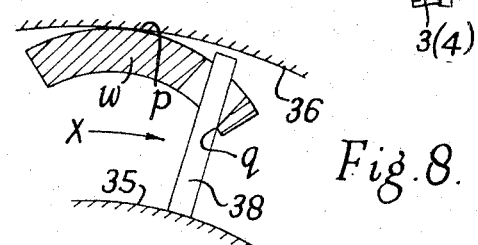
Figure 7:
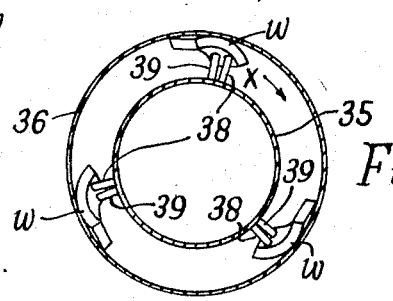
FIGURE 7 is a fragmentary cross-section through the evaporator of FIGURE 6 on the section line 7—7 thereof.

FIGURE 8 is a fragmentary sectional view through the evaporator of FIGURE 6 on the section line 8—8 thereof, this view being drawn on a larger scale than FIGURES 6 and 7; and FIGURE 9 is a fragmentary cross-sectional view through a still or evaporator in accordance with the invention in which each set of axially spaced wipers is supported on a tube allocated specifically to it as earlier visualized herein.

Figure 1:
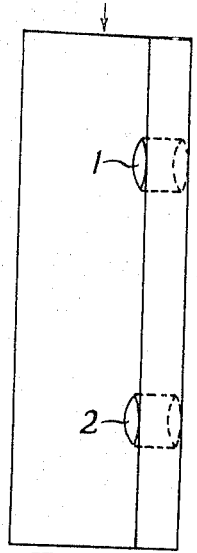
FIGURES 1 and 2 illustrate a typical wiper element of shape A as used in a still or evaporator in accordance with this invention, FIGURE 1 being an elevational view of the element and FIGURE 2 an end view thereof looking in the direction of the arrow in FIGURE 1.
Figures 2, 4:
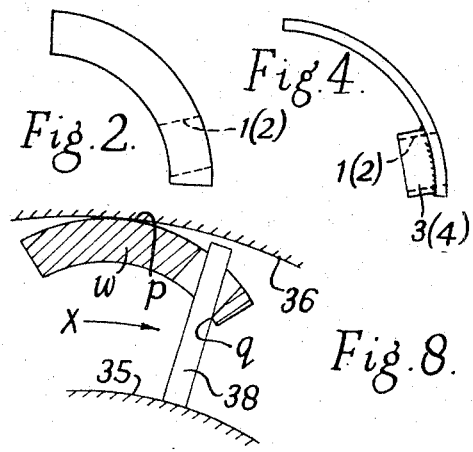

The wiper element illustrated in FIGURES 1 and 2 has the form hereinbefore described of a quadrant of a cylinder and has two peg holes 1, 2.

Figure 3:
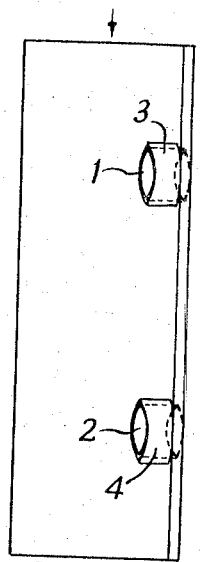
FIGURES 3 and 4 are similar views illustrating a typical wiper element of shape B as used in a still or evaporator in accordance with the invention.

The wiper element illustrated in FIGURES 3 and 4 is also of cylinder-quadrant form but is of smaller thickness dimension than the element of FIGURES 1 and 2, the body of the element being formed with bosses 3 and 4 whose bores form part of the peg holes of the element, as hereinbefore described.

The plant illustrated in FIGURE 5 includes a film evaporator, generally marked E, comprising a vertically disposed steam jacketted shell 5 having the form of a cylinder coaxially surmounting a cone frustum.

The steam jacket of shell 5 is marked 6 and surmounting the shell, coaxially therewith, is a vapour receiver 7 having a vapour outlet 8 communicating with a vapour draw-off pipe 9 leading to the inlet of condenser 10 whose outlet 11 is connected by a pipe 12 controlled by a valve 13 to the inlet of a condensate/vacuum pump 14 driven by a motor 15.

Feed liquor is fed into the evaporator by a feed pump 16 communicating with a feed pipe 17 whose outlet 18 delivers the liquor onto an annular distributor device (not shown) located within the evaporator immediately adjacent the top of shell 5, said distributor device being operative to distribute the liquor evenly around the upper margin of the internal (heated) surface of the shell, from which upper margin the liquor then commences to flow down said surface by gravity, later to be assisted in its downward flow by the propulsion action of the wipers of the evaporator as hereinbefore described.

Disposed coaxially within the structure formed by the shell 5 and the vapour receiver 7 is a rotor constituted by a rigid cylinder 19 surmounting and fast with a rigid cone-frustum shaped member 20, said rotor being spaced from shell 5 for the entire depth thereof by a relatively narrow annular space 21.

Evaporation of the liquor proceeds within the space 21, the vapours rising therein into vapour receiver 7 from which they become drawn off into condenser 10 for condensation therein in conventional manner, by the action of pump 14.

Rotor 19, 20 is rotationally hung upon an upper bearing carried in a mounting 22 incorporating means for sealing the interior space of vapour receiver 7.

Rotor 19, 20, which rotates in the direction of arrow R, is also supported at its lower end in a journal bearing 23 carried upon a supporting member 24 incorporated with the shell of the evaporator, and is driven by an overhead motor 25 through a worm reduction gear 26.

The lower end of space 21 communicates, by way of a product outlet 27, a valve 28 and a steam jacketted discharge pipe 29, with a product extraction pump 30 driven by a motor 31.

Situated within annular space 21, intermediately between shell 5 and rotor 19, 20, are a series of bars 32. These bars, which are arranged at equal angular intervals around the axis of the evaporator, are carried by the rotor 19, 20 in fast relation thereto and form in effect an integral part thereof.

Projecting outwardly from each of the bars 32, substantially radially of the evaporator, are a series of pairs of pegs 33, 34.

Carried upon each pair of pegs 33, 34 is a wiper W which may be either of the A shape illustrated in FIGURES 1 and 2, or of the B shape illustrated in FIGURES 3 and 4. In either case the wiper is of such shape as to possess characteristic $a$ of the three essential characteristics $a$, $b$ and $c$ of the wiper elements of a still or evaporator in accordance with the present invention as hereinbefore set forth, is so mounted on the rotor 19, 20 (through the intermediary of pegs 33, 34) as to possess characteristic $b$ of said three characteristics, and is further of such shape as to possess characteristic $c$ of said three characteristics. As to characteristic $c$ it will be seen that the pegs 33, 34 are located on a line which, in the elevational view of the evaporator, is inclined to the vertical axis of the evaporator shell with the result that, as hereinbefore set forth, the wiping line of the associated wiper, when the latter is in operative (wiping) position relative to the evaporator shell, is disposed between the leading and trailing edges of the operative face of the wiper and at an inclination to the rotor axis, the direction of said inclination being such that the propulsive action aforesaid of the wiper is in the downward direction and therefore towards the product outlet 27 of the evaporator.

It will also be seen that the wipers W on successive bars 32 around the axis of the rotor are in staggered relation to one another axially of the rotor so as to provide an arrangement in which the entire length of the shell 5 is swept by the wipers, considering them in the aggregate.

It will be understood that the number, the spacing (both axially and circumferentially of the evaporator) and the size (relatively to the size of the evaporator) of the wipers will depend upon the working requirements of the evaporator. The particular arrangement shown may therefore be departed from widely.

Referring now to FIGURES 6 and 7, the rotor, which is marked 35, of the evaporator illustrated in these figures is, as already remarked, of torpedo shape. Thus its geometrical form is made up of an elongated cylinder having at the two ends respectively thereof a pair of oppositely directed cone frustums. It rotates, in the direction of arrow X, within an elongated steam-jacketed shell 36 (the steam jacket of this shell is not shown in the figures) whose shape is cylindrical for the major portion of its length, the lower portion 37 of the shell being of frustoconical shape to conform to the lower end of the rotor 35. Located within the annular space 37, between the rotor 35 and the shell 36, are three series of wipers $w$ of similar shape and manner of mounting to the wipers W of the evaporator of FIGURE 5, except that the carrier pegs 38, 39 are carried directly upon the torpedo shaped rotor 35 as is clearly apparent from the figures. As in the evaporator of FIGURE 5 the wipers $w$ of each series thereof are in such staggered relation to those of the adjacent series as to result in the entire length of the shell 36 being swept by the wipers, and again as in said evaporator of FIGURE 1, the carrier pegs 38, 39 are so placed as to cause the wiping lines of the wipers to be at a slight inclination (in the elevational view of the evaporator) to the axis of the shell 36, the inclination being in the direction to result in the propulsive action aforesaid of the wipers being downward and therefore in the direction of the product outlet O of the evaporator.

Referring now to FIGURE 8, this figure shows one of the wipers $w$ in the operative (wiping) position thereof. It will be seen that when the wiper is in this position, to which position it is brought by centrifugal forces acting upon the wiper as the assembly comprising the rotor 35, the carrier pegs 38 and 39 and the wipers $w$ revolves within the shell 36, the wiper is in contact with shell 36 at point $p$, which lies in the wiping line $l$ (FIGURE 6) of the wiper, and with carrier peg 38 at point $q$. The wiper is also, when in this position, in contact with carrier peg 39 at an identical point therealong and this point and said point $q$ on peg 38 form together a fulcrum for the wiper about which the latter is pivotably swingable, in a plane substantially perpendicular to the rotor axis, relatively to the shell 36 as the wiper performs its spreading action upon the layer of liquor flowing down the shell surface.

What has been stated, as to the manner of operation of wipers $w$, applies also in principle to wipers W of the evaporator of FIGURE 5 and indeed to any of the wipers used in a still or evaporator constructed in accordance with the present invention.

In FIGURE 9, the tubes which support the wipers $ww$ are marked 40. The three tubes form an integral part of the rotor of the evaporator and it will be seen that the wipers are mounted on the tubes through the intermediary of carrier pegs 41 as in the previously described constructions.

FIGURES 10 and 11 (not hitherto mentioned) represent, largely in outline, an external view of a still or evaporator generally similar to the apparatus shown in FIGURE 5 but of slightly different proportions, as will appear from a comparison of the respective figures.

Certain parts of the apparatus, namely, inter alia, the condenser and the condensate/vacuum pump and its driving motor, are omitted in these figures. FIGURE 10 is an elevational view and FIGURE 11 a plan view.

Using the same reference letters and numerals as those used in FIGURE 5, the plant shown in FIGURES 10 and 11 includes a film evaporator E surmounted by a vapour receiver 7 having a vapour outlet communicating with a condenser (as remarked, not shown), by way of a drawoff pipe (also not shown), the draw-off pipe leading to the inlet of the condenser, whose outlet communicates in turn, by way of a control valve, with the inlet of a condensate/vacuum pump driven by a motor—all as in the form of the invention illustrated in FIGURE 5.

Feed liquor is fed into evaporator E by way of a feed liquor inlet 18 and product leaves the evaporator by way of a product outlet 27 controlled by a valve 28, outlet 27 being at the lower end of a conical portion $E_1$ of the evaporator located immediately below the cylindrical portion 6 thereof—again as in the construction illustrated in FIGURE 5.

M is a motor drivingly connected to the rotor of the evaporator, which rotor is generally of the construction described with reference to FIGURES 1, 2, 3, 4, 5 and 8, as also is the shell of the evaporator.

Evaporator E is mounted on a supporting structure S including a platform P for personnel, in conventional manner.

What I claim as my invention and desire to secure by Letters Patent of the United States is:

1. An evaporator comprising an evaporator chamber circular in cross-section and having a heated wall, an inlet for material to be treated, an outlet for withdrawal of vapor and an outlet for withdrawal of the treated material, a rotor mounted in said chamber, wiper elements carried by said rotor and contacting said wall to spread said material thinly on said wall, said elements cooperating with said wall for advancing said material from said inlet to said material outlet, means mounting said wiper elements on said rotor for limited floating non-rotatable movement relative thereto in a plane perpendicular to the rotor axis, and said element being of curvilinear profile in a plane perpendicular to the rotor axis and each of said wiper elements having a leading edge and a trailing edge and being rockable about its leading edge, and making substantially tangential line contact with said wall.

2. An evaporator according to claim 1, wherein each wiper element constitutes subtantially a 90 degree segment of a cylinder.

3. An evaporator according to claim 1, wherein the rotor carries groups of radially extending, axially arranged pegs, each group extending through holes in the leading edge of one of said wiper elements and adjustably carrying said wiper element.

4. An evaporator according to claim 3, wherein both the holes and the pegs are substantially cylindrical.

5. An evaporator according to claim 4, wherein the pegs of each group are coplanar and said plane extends at an angle to the rotor axis whereby said line of contact extends obliquely to the rotor axis.

6. An evaporator according to claim 5, wherein the diameter of the holes is greater than the diameter of the pegs and the difference between the two diameters is such that the wiper element has complete freedom for floating movement on the pegs substantially in a plane perpendicular to the rotor axis and is centrifugally urged toward the said wall and wherein the said line of contact with said wall is located approximately midway between the leading and trailing edges of said element and said inclination of said line being such that the component of thrust of the element upon the material is in the direction of said material outlet of the evaporator.

7. An evaporator according to claim 6, wherein the thickness of each wiper element is uniform and of wear-resistant composition.

8. An evaporator according to claim 6, wherein the wiper elements are in mutually staggered relation to one another, longitudinally of the rotor, so as to collectively wipe the entire surface of the evaporator wall.

9. An evaporator according to claim 8, wherein said rotor consists of a single tube of a diameter less than that of the evaporator wall and disposed coaxially with said wall, said carrier pegs for said wiper elements projecting from the outer surface of said tube.

10. An evaporator according to claim 6, wherein the upper portion of said evaporator is cylindrical and the lower portion is a material collecting and discharging cone.

11. An evaporator according to claim 10, wherein the rotor is provided with a downwardly extending conical extension spaced at its outer periphery a short distance from the inner surface of said discharge cone and carries at least one wiper for said surface.

12. An evaporator according to claim 11, wherein the axis of said evaporator chamber is substantially vertical and the wall thereof is surrounded by a heating element.

References Cited by the Examiner

UNITED STATES PATENTS

| 1,672,218 | 6/1928 | How | 159—6 |
| 2,546,381 | 3/1951 | Zahm | 159—6 |
| 2,774,415 | 12/1956 | Belcher | 159—6 |
| 3,058,516 | 10/1962 | Brunk | 159—6 |
| 3,067,812 | 12/1962 | Latinen et al. | 159—6 |
| 3,130,108 | 4/1964 | Eckstrom et al. | 159—6 |
| 3,180,398 | 4/1965 | Belcher et al. | 159—6 |
| 3,190,817 | 6/1965 | Neugebauer et al. | 159—6 X |
| 3,199,575 | 8/1965 | Keller | 159—6 |

FOREIGN PATENTS

| 1,345,608 | 11/1963 | France. |
| 1,121,587 | 1/1962 | Germany. |

NORMAN YUDKOFF, *Primary Examiner.*

J. SOFER, *Assistant Examiner.*